United States Patent [19]
Gross

[11] Patent Number: 5,921,199
[45] Date of Patent: *Jul. 13, 1999

[54] CAR LOCATOR

[75] Inventor: Leon S. Gross, Philadelphia, Pa.

[73] Assignee: Enterprises, Inc., Philadelphia, Pa.

[ * ] Notice: This patent is subject to a terminal disclaimer.

[21] Appl. No.: 08/360,267

[22] Filed: Dec. 21, 1994

Related U.S. Application Data

[63] Continuation-in-part of application No. 08/303,457, Sep. 9, 1994, Pat. No. 5,609,121.

[51] Int. Cl.⁶ .................. B60Q 9/00; G09F 7/20
[52] U.S. Cl. .................. 116/28 R; 116/173; 40/591
[58] Field of Search .................. 116/28 R, 173, 116/209; 40/591, 592, 597, 600, 611, 542, 549, 661

[56] References Cited

U.S. PATENT DOCUMENTS

| | | | |
|---|---|---|---|
| D. 165,495 | 12/1951 | Thibault | D14/6 |
| D. 173,202 | 10/1954 | Hollins | D48/32 |
| D. 322,413 | 12/1991 | Castillo | D10/110 |
| D. 326,432 | 5/1992 | McNulty | D11/165 |
| D. 330,730 | 11/1992 | Watanabe | D20/10 |
| 1,708,459 | 4/1929 | Wood . | |
| 3,136,289 | 6/1964 | Johnson | 40/591 |
| 3,540,406 | 11/1970 | Dexter | 116/28 R |
| 3,889,384 | 6/1975 | White | 116/28 R |
| 4,054,302 | 10/1977 | Campbell | 116/28 R |
| 4,633,215 | 12/1986 | Anders et al. | 116/28 R X |
| 5,103,382 | 4/1992 | Kondo et al. | 362/80.1 |
| 5,203,621 | 4/1993 | Weinmeister et al. | 362/66 |
| 5,299,525 | 4/1994 | Romesburg | 116/173 |
| 5,307,251 | 4/1994 | Shaffer | 40/542 X |
| 5,558,424 | 9/1996 | Zeligson | 362/66 |
| 5,595,441 | 1/1997 | McGee | 362/250 |
| 5,609,121 | 3/1997 | Gross | 116/28 R |

FOREIGN PATENT DOCUMENTS

| | | | |
|---|---|---|---|
| 20070 | 12/1991 | WIPO | 40/542 |

*Primary Examiner*—Richard Chilcot
*Assistant Examiner*—Willie Morris Worth
*Attorney, Agent, or Firm*—Donald R. Piper, Jr.; Dann, Dorfman, Herrell and Skillman, P.C.

[57] ABSTRACT

A car locator is provided having a base for attaching the locator to a car. A cantilevered support rod is pivotally connected with the base to permit pivotal movement and positioning of the rod relative to the base. A hollow marking sleeve having an outer transparent tube and an inner fluorescent liner disposed within the tube slidably mounts onto the support rod for marking the car. The sleeve engages the support rod with sufficient contact force to retain the sleeve in position on the support rod. The sleeve is slidably removable from the support rod so that the sleeve may be pulled from the support rod.

20 Claims, 3 Drawing Sheets

FIG. 1
FIG. 2
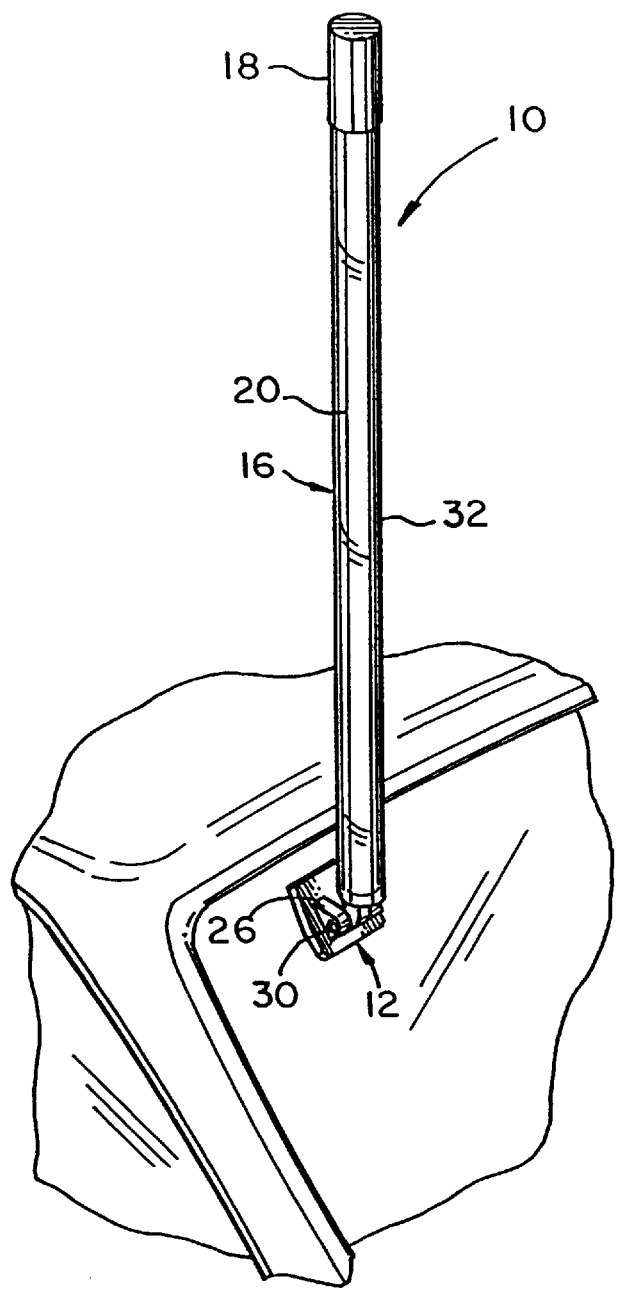
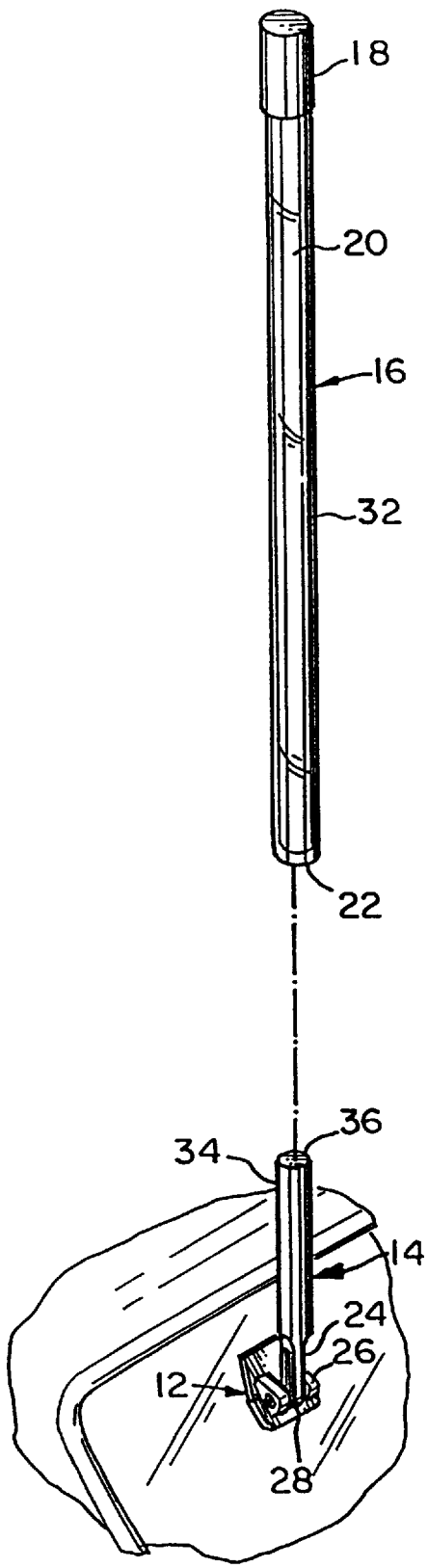

FIG.3 FIG.4 FIG.5 FIG.6
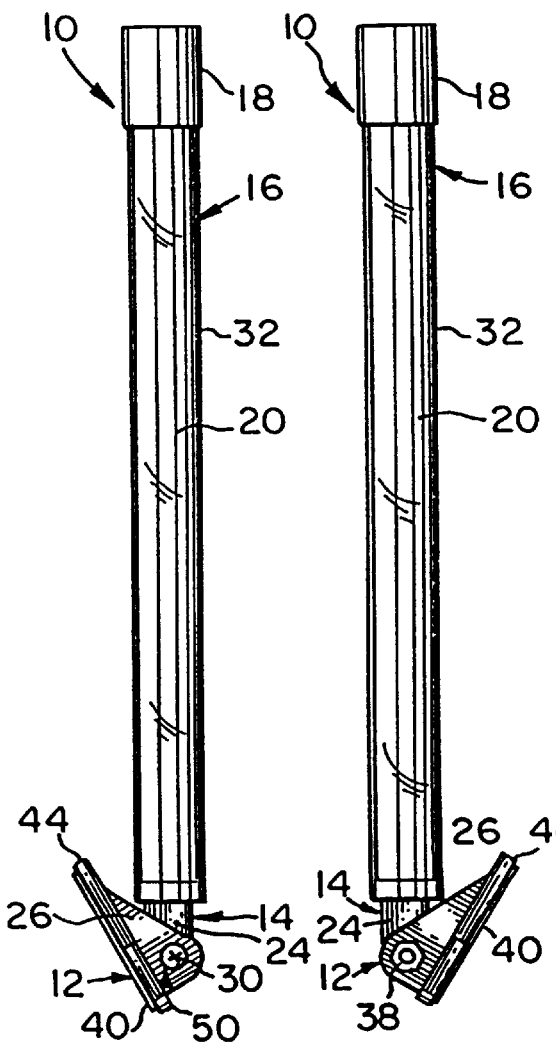
FIG.7 FIG.8
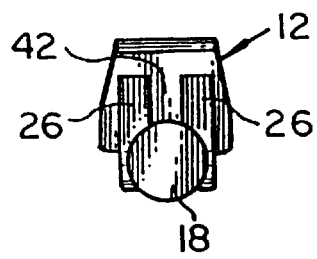 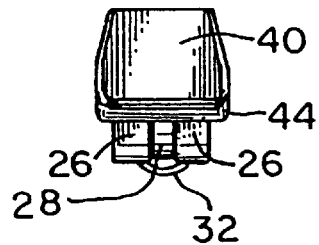

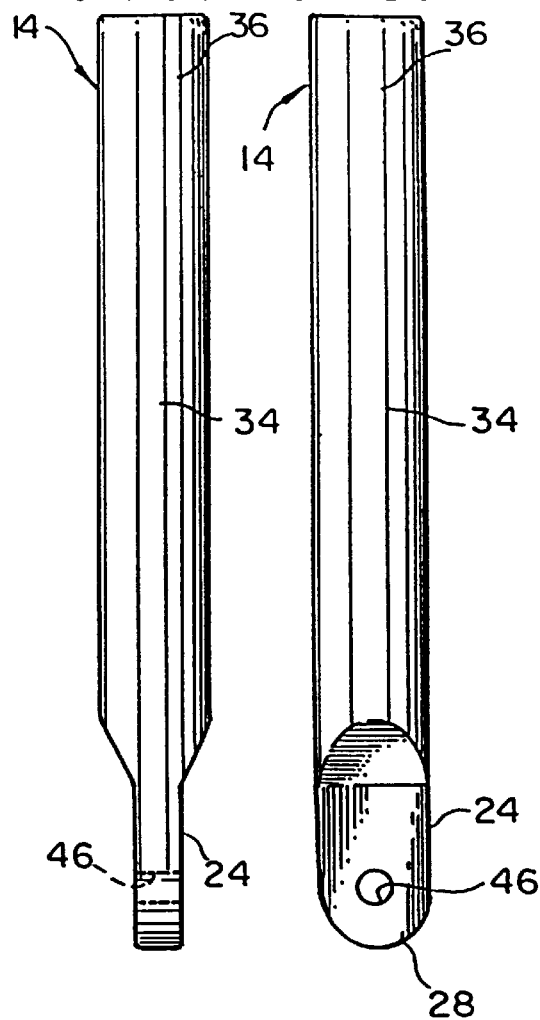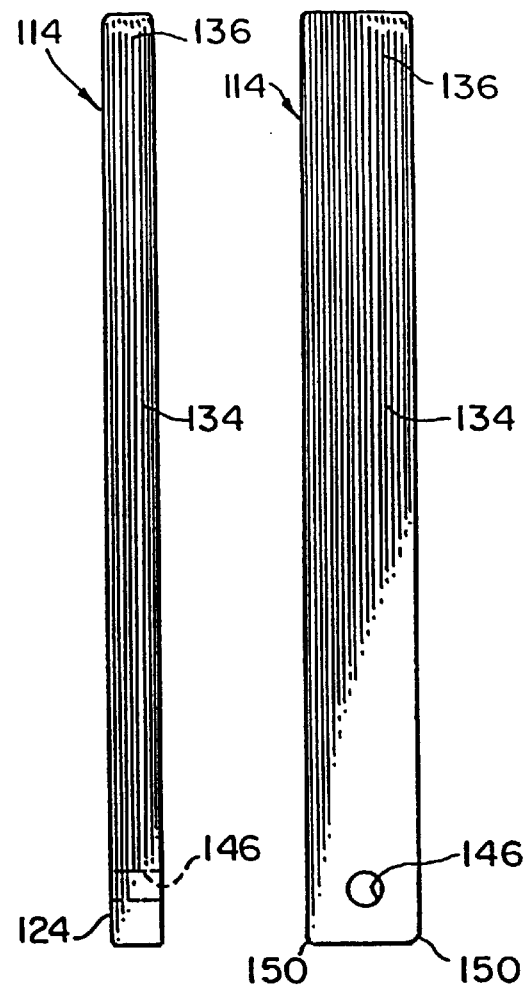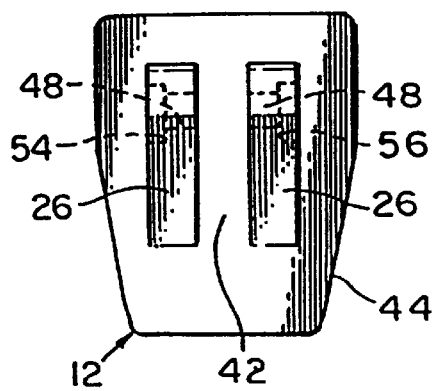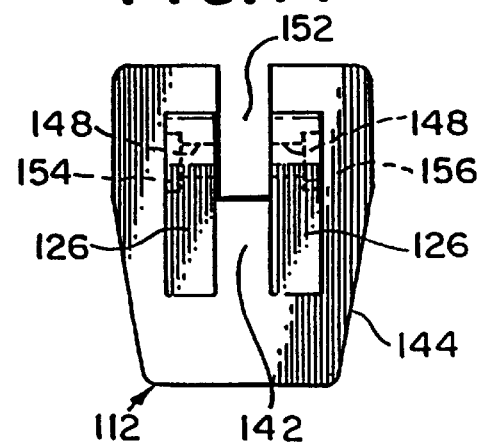

CAR LOCATOR

Related Application

This application is a continuation-in-part of U.S. application Ser. No. 303,457, filed on Sep. 9, 1994, now U.S. Pat. No. 5,609,121.

FIELD OF THE INVENTION

The present invention generally relates to a car locator and, more specifically, to a highly visible or fluorescent car locator that mounts to and projects from a car in a conspicuous position to assist a user in locating his or her car in a parking area.

BACKGROUND OF THE INVENTION

Various types of markers have been used over the years to help people locate their vehicles in a variety of parking areas. Typically, a car marker, such as a ribbon or a ball, is attached to a radio antenna or in some other conspicuous location on a car to provide enhanced visibility of the car in parking areas.

One of the problems frequently encountered in utilizing conventional marking devices has been the difficulty of securing such devices to a car to prevent inadvertent detachment while at the same time enabling the devices to be conveniently reoriented or removed if necessary. In many instances, for example, tools may be required to affix or remove the devices. While not an overwhelming problem, the need for tools becomes most inconvenient if the marking device must be removed at remote locations. For example, the need for tools becomes a particular nuisance if the car marker must be temporarily removed at a location such as an automatic car wash.

In other instances, suction cup mounting has been employed to eliminate the need for tools. However, the use of suction cups is not always satisfactory because suction cups require a suitable mounting surface—one that is dry, clean and relatively flat, to permit secure attachment. The tendency of suction cups to prematurely release due to temperature or pressure changes is also a problem. As a result, the marking device might be damaged or lost in the event that a user neglects to remove the device prior to driving the car.

Other conventional devices suffer from the drawback that, once mounted, such devices cannot be easily repositioned into less conspicuous orientations. In accordance with the present invention, a car locator is provided that is capable of being moved into a highly visible orientation to facilitate in the location of a car, but is also capable of being conveniently repositioned or partially disassembled if the need arises.

SUMMARY OF THE INVENTION

In accordance with the present invention, a car locator is provided. The car locator includes fluorescent colors for high visibility. The car locator may be positioned to project above the top of a vehicle to enable visibility at a distance. The car locator includes a base for mounting the locator to the car. The base has a mounting section that generally conforms to the mounting surface of the car and is secured to the car using a mounting attachment such as a two-sided adhesive or a magnet attached to the base. In addition, the base includes a rod support in the form of two opposing support ribs projecting from the base to form an intermediate groove.

A cantilevered support rod having a mounting end and a free end is mounted on the base. The mounting end of the rod is pivotally connected to the rod support of the base on a pin that passes through a hole in the mounting end of the rod. The pin traverses the groove of the base and is supported at opposite ends by the opposing support ribs of the base. The pin allows pivotal movement of the rod relative to the base. An end portion of the mounting end of the rod is disposed in the groove between the support ribs and moves within the groove during pivotal movement of the rod. The free end of the rod projects from the base to provide a cantilevered support arm. The rod may be pivotally moved between selected positions relative to the base. The rod remains in position relative to the base after the rod is moved to selected positions.

A highly visible fluorescent post in the form of a marking sleeve is mounted on the support rod to mark the car in a highly conspicuous manner. For this purpose, the sleeve includes bold markings, such as fluorescent colors, to enhance the visibility of the car locator. For example, the sleeve may include a transparent outer tube and a fluorescent inner liner to provide a highly visible marker. The sleeve has an opening at one end to permit slidable mounting of the sleeve onto the free end of the rod. The open end of the sleeve has a predetermined inside width that is generally the same as the outside width of the free end of the rod so that cooperating contact between the sleeve and the rod retains the sleeve in position on the rod. The sleeve sufficiently engages the free end of the rod to hold the sleeve in position on the rod.

BRIEF DESCRIPTION OF THE DRAWINGS

The foregoing summary, as well as the following detailed description of the preferred embodiments of the present invention, will be better understood when read in conjunction with the appended drawings, in which:

FIG. 1 is a perspective view of the car locator mounted to a back window of a car in accordance with the present invention;

FIG. 2 is an exploded perspective view of the car locator shown in FIG. 1;

FIGS. 3 and 4 are side elevational views of the car locator;

FIG. 5 is a front elevational view of the car locator;

FIG. 6 is a back elevational view of the car locator;

FIG. 7 is a top plan view of the car locator;

FIG. 8 is a bottom plan view of the car locator;

FIG. 9 is an enlarged front elevational view of a support rod for the car locator in accordance with the present invention;

FIG. 10 is an enlarged side elevational view of the support rod for the car locator;

FIG. 11 is an enlarged top plan view of a base for the car locator;

FIG. 12 is an enlarged front elevational view of a support rod for use with a car locator in accordance with another preferred embodiment of the invention;

FIG. 13 is an enlarged side elevational view of the support rod shown in FIG. 12; and FIG. 14 is an enlarged top plan view of an alternative base of a car locator for use in conjunction with the support rod shown in FIGS. 12 and 13.

DETAILED DESCRIPTION OF THE PREFERRED EMBODIMENT

Referring to FIGS. 1 and 2, a highly-visible car locator, generally designated 10, serving as a vehicle locator device, is provided for placement on a vehicle for conspicuously marking the vehicle to assist in the location of the vehicle in a parking area. The car locator 10 may also be used to designate a status of a particular car. For example, an attendant at a rental car parking lot might use the car locator to designate those automobiles that are available for rental. In addition, different colors may be employed to delineate other types of vehicle status, such as long term or short term parking.

Generally, the car locator 10 includes a base 12 for attaching the car locator to the car. A cantilevered support rod 14 is pivotally connected with the base. The support rod 14 may be adjusted by manual displacement to project upwardly from the car to enable prominent marking of the car. Alternatively, the support rod 14 may be moved into a generally downward position extending generally along the surface of the car when marking of the car is not desired. To adjust the position of the support rod 14, the user simply pivots the support rod 14 relative to the base 12 stopping at a desired position. A highly-visible marking post in the form of a sleeve 16 having a fluorescent color may be mounted on the support rod 14 to enhance visibility of the marker. The sleeve 16 may be of various colors and configurations to differentiate vehicles when multiple users are utilizing the marking device.

The base 12 of the car locator is formed or molded from plastic and includes a mounting section 44 having a generally flat surface in order to conform to the generally flat surfaces of the cars on which the car locator 10 is to be mounted. For example, the generally flat surface of the mounting section 44 of the base 12 enables the car locator 10 to be securely mounted on a conforming flat surface of the rear window of a car as shown in FIG. 1. Alternatively, the mounting section 44 of the base 12 may be configured for mounting on irregular surfaces. For example, a slightly concave surface may be desirable when mounting the base 12 to a curved or convex section of the car.

A mounting attachment is provided on the base to permit the car locator to be securely attached to the car. For this purpose, a two-sided adhesive strip 40 may be attached to the mounting section 44 of the base for securing the base 12 of the car locator 10 to the car. Alternatively, a magnet attached to the base 12 may be used to facilitate removable mounting of the car locator 10 to the car.

The base 12 of the car locator 10 includes a rod support section having two spaced-apart support lugs in the form of opposing ramp-shaped ribs 26 projecting from the mounting section of the base to form a longitudinal groove 42 therebetween. The groove 42 provides a pathway extending across the top surface of the base 12.

A pivot pin 50 is held in position by the support ribs 26. The opposing ends of the pivot pin 50 are disposed in aligned holes 48 provided in the opposing support ribs 26 of the base 12 so that the pin 50 traverses the groove 42.

As shown in FIGS. 9 and 10, the support rod 14 may be in the form of a solid plastic cylindrical shaft 34 having a mounting end 24 for connection with the base 12 and a free end 36 for projection from the base to provide a pivotally movable, cantilevered support arm. The mounting end 24 of the support rod connects to the base 12 by pivot pin 50 which is inserted through an aperture 46 in the mounting end 24 of the support rod 14. The support rod 14 rotates about the pin 50.

The mounting end 24 of the cylindrical rod 34 is tapered into a generally flat end portion 28 that interfits within the groove 42 of the base 12 in friction fit between the support ribs 26. The support ribs 26 serve to guide the pivotal movement of the cantilevered support rod 14 by restricting lateral movement of the mounting end 24 of the support rod within the groove 42. The end portion 28 of the mounting end 24 of the rod is rounded to provide sufficient clearance between the end portion 28 of the rod and the base 12 on which the rod 34 is mounted to permit the rod 14 to freely pivot about pin 50 between selected raised and lowered positions. As the rod is pivoted, the rounded end portion 28 of the mounting end swings within the groove 42 between the support ribs 26 without contacting the base.

The pin 50 that connects the rod 14 to the base 12 is in the form of a screw 30 having a generally smooth central section on which the support rod is mounted and external threads on one end and a head on the other end. A corresponding hexagonal nut 38 is provided having internal threads for engaging the external threads of the screw 30. A counterbore 54 is provided at the outside surface of one of the ribs 26 to countersink the head of the screw 30. A hexagonal recess 56 is provided at the outside surface of the other rib 26 to countersink the hexagonal nut 38. The hexagonal recess 56 prevents the recessed nut 38 from turning during rotation of the screw 50. Alternative pin arrangements, such as rivets, may also be used to connect the support rod 14 to the base 12.

The use of a screw 30 and nut 38 enables the friction fit between the ribs 26 and the interfitting flat end portion 28 of the rod 14 to be adjusted. When assembled, the threads on the screw mate with the threads on the nut. Consequently, when the screw is turned in one direction, the width of the groove 42 contracts and thereby increases the frictional contact force between the flat end portion 28 of the support rod 14 and the ribs 26 of the rod support. Alternatively, rotation of the screw in the opposite direction permits expansion of the groove 42 and thereby decreases the frictional contact force between the ribs 26 and the mounting end of the rod 14. Preferably, the friction fit between the support rod and the ribs of the base is adjusted to be loose enough so that the support rod 14 may be manually moved between desired positions but tight enough so that the support rod will be held in position after manual movement. A sufficient force should be provided to prevent the support rod from freely flopping back and forth.

An alternative rod configuration is shown in FIGS. 12 and 13. As illustrated, the support rod 114 is in the form of a bar 134 having a mounting end 124 and a free end 136. The mounting end 124 has square corners 150 and a throughhole 146. An alternative base 112, as shown in FIG. 14, is also provided. The base 112 includes a mounting section 144, a pair of ribs 126, and an intermediate groove 142 formed between the ribs 126. Through-holes 148 are provided in the ribs to support a screw 30 to permit mounting of the rod 114 to the base 112. In addition, a counter-bore 154 and a hexagonal recess 156 are provided in the ribs 126 to respectively countersink the head of the screw 30 and the nut 38. A clearance slot 152 is provided in the mounting section 144 of the base 112 in alignment with groove 142 to provide sufficient clearance between the square corners 150 of the rod 114 and the base 112 so that the square shoulders 150 pass within the slot 152 during pivotal movement of the rod 114. The clearance slot 152 provides swing room for the square corners of the support bar 134.

In operation, the base 12 and the support rod 14 may be used to mark the car as shown in FIG. 2. To enhance effectiveness as a car locator, the support rod 14 may be formed from a fluorescent-colored plexiglass material, which is highly visible from long distances. To further enhance the effectiveness of the car locator 10, a highly visible marking post in the form of a marking sleeve 16 is provided for attachment to the support rod 14. The marking sleeve 16 includes a generally hollow plastic outer tube 32 having open ends 22 and an inner cylindrical surface. The outer tube 32 may be made from a transparent plastic so that a colored or highly visible insert 20 disposed within the tube 32 is visible through the tube. The insert 20 may be formed as an inner liner for the tube by rolling a piece of fluorescent-colored paper into a tube with the fluorescent side of the paper facing outward. The rolled paper may then be inserted into the tube 32 through the open end 22. Once inserted, the rolled liner tends to unroll and thereby engages the inner cylindrical surface of the outer tube to hold the liner in position. Any colored or otherwise decorated insert may be used. The use of inserts permits convenient color selection or change. In other embodiments, a colored or decorated outer tube 32 may be used in addition to or instead of the insert. In addition, fluorescent paper may be crumpled and stuffed inside the tube 32.

A plastic end cap 18 is provided over the free end of the outer tube 32. The cap 18 is in friction fit with the tube 32 and functions to seal the free end of the tube 32. The other end of the tube remains open to permit slidable mounting of the tube onto the support rod.

Initially, a user of the car locator mounts the base 12 and rod 14 of the locator to a suitable surface of a car, such as a rear window. The car locator 10 can be used without the hollow sleeve 16, in which case the rod is pivotally adjusted to project upwardly away from the car to mark the car. For more visible marking, the hollow sleeve 16 is slipped onto the support rod 14. The sleeve 16 may either loose fit or slip fit over the free end of the support rod 14 or, alternatively, friction fit with the support rod. If the sleeve is dimensioned relative to the rod to engage the rod in loose fit or slip fit, the length of the rod must be sufficiently long relative to the length of the sleeve to retain the sleeve on the rod during use. The outside width of the free end of the rod must be about the same width as the inside width of the open end of the sleeve to provide a small amount of spacing therebetween to enable a slip fit. Alternatively, if the sleeve is dimensioned relative to the rod to engage the rod in friction fit, the outside width of the free end of the rod is dimensioned to be virtually the same as the inside width of the open end of the sleeve so that the contact force between the sleeve and the rod is sufficient to hold the sleeve on the rod. A loose fit or slip fit is desirable if the user of the car locator 10 wishes the sleeve 16 to be readily removable from the support rod simply by slipping or sliding the sleeve on and off the rod. In contrast, a friction fit may be desirable when the user of the car locator 10 desires the sleeve 16 to be retained more firmly on the support rod. Whether used in slip fit or friction fit, fasteners are not required to attach the sleeve to the rod. Consequently, tools are not required to install or remove the sleeve relative to the support rod.

The free end 36 of the rod 14 has an outside width, and optionally an outside shape, that is generally the same as the inside width, and optionally an inside shape, of the open end of the sleeve 16 so that cooperating contact between the sleeve 16 and the rod 14, whether in slip fit or friction fit, retains the sleeve 16 in position on the rod 14 without the use of fasteners or connectors. In the embodiment of the invention shown in FIGS. 12–14, the free end 136 of the support rod 114 has an outside width or dimension that is generally the same as the inside diameter or width of the open end of the sleeve 16 so that cooperating contact, between the sleeve 16 and the side edges of the rod 114, again whether in slip fit or friction fit, retains the sleeve 16 in position on the rod 114.

It will be recognized by those skilled in the art that changes or modifications may be made to the above-described embodiments without departing from the broad inventive concept of the invention. It should therefore be understood that this invention is not limited to the particular embodiments described herein but is intended to include all changes and modifications that are within the scope and spirit of the invention as set forth in the following claims.

What is claimed is:

1. A vehicle locator comprising:
   (a) a base for mounting the locator to the vehicle, the base having a mounting section for engaging the vehicle to permit the locator to be mounted on the vehicle and a rod support;
   (b) a cantilevered support rod projecting from the base having a free end of predetermined outside width and a mounting end pivotally connected at the rod support of the base to permit the rod to be pivotally moved between selected positions relative to the base, the rod being frictionally held by the rod support relative to the base to enable the rod to remain in position after the rod is moved between positions; and
   (c) a highly visible marking post on the support rod, wherein the marking post comprises a clear plastic outer tube and an inner liner visible through the tube.

2. The locator according to claim 1 wherein the marking post has an open end to permit slidable mounting of the marking post or to the cantilevered support rod for marking of the vehicle, the open end of the marking post having an inside width that enables cooperating contact between the marking post and the rod to retain the marking post in position on the rod.

3. The locator according to claim 2 wherein the free end of the rod is of a sufficient width relative to the width of the open end of the marking post so that the marking post engages the rod in slip fit and wherein the rod is of a sufficient length relative to the length of the marking post to retain the marking post on the rod.

4. The locator according to claim 2 wherein the free end of the rod is of a sufficient width relative to the width of the open end of the marking post so that the marking post engages the rod in friction fit to retain the outer tube on the rod.

5. The locator according to claim 1 wherein the liner includes a flouresent color.

6. The locator according to claim 1 wherein the rod support includes a pathway and wherein the mounting end of the rod is disposed within the pathway to permit the pivotal movement of the rod.

7. The locator according to claim 6 wherein the locator includes a pin traversing the pathway of the rod support and wherein the mounting end of the rod is mounted on the pin for rotational movement of the rod about the pin.

8. The locator according to claim 7 wherein the mounting end of the rod is in friction fit with the rod support of the base for maintaining the rod in position upon rotational movement of the rod.

9. The locator according to claim 8 comprising adjustment means for adjusting the friction fit between the rod support of the base and the mounting end of the rod.

10. The locator according to claim 6 wherein the mounting end of the rod is generally flat and includes a rounded end portion to permit pivotal movement of the mounting end within the pathway.

11. The locator according to claim 6 wherein the base includes a clearance slot in alignment with the pathway and wherein the mounting end of the rod is flat and includes an end portion disposed within the clearance slot to provide swing room for the end portion of the mounting end of the rod through the clearance slot during pivotal movement of the rod.

12. The locator according to claim 1 comprising an adhesive mounting attachment on the mounting section of the base to permit mounting of the locator to the vehicle.

13. A vehicle locator comprising:
   (a) a base for mounting the locator to the vehicle, the base having a mounting section for engaging the vehicle to permit the locator to be mounted on the vehicle and a rod support;
   (b) a cantilevered support rod projecting from the base having a free end of predetermined outside width and a mounting end pivotally connected at the rod support of the base to permit the rod to be pivotally moved between selected positions relative to the base, the rod being frictionally held by the rod support relative to the base to enable the rod to remain in position after the rod is moved between positions; and
   (c) a highly visible marking post on the support rod, wherein the marking post includes a transparent tube and a fluorescent insert disposed within the tube.

14. The locator according to claim 13 wherein the transparent tube includes a free end and wherein the locator comprises a cap mounted on the free end of the tube to enclose the tube.

15. A vehicle locator comprising:
   (a) a base for mounting the locator to the vehicle, the base having a mounting attachment for attaching the locator to the vehicle and a rod support having a pair of support ribs forming a groove therebetween;
   (b) a pin supported by the support ribs traversing the groove;
   (c) a cantilevered support rod having a free end extending away from the base and a mounting end disposed within the groove of the base, the mounting end of the rod being mounted on the pin for pivotal movement of the rod and being held in friction fit between the support ribs of the base to retain the rod in position after pivotal movement of the rod; and
   (d) a highly visible marking post on the support rod, wherein the marking post includes a marking sleeve having an opening at one end to permit slidable mounting of the sleeve onto the rod for marking of the vehicle, the sleeve including a transparent tube and a fluorescent liner disposed within the tube.

16. The locator according to claim 15 wherein the mounting end of the rod includes an end portion having generally square corners and wherein the base includes a clearance slot aligned with the groove of the base and wherein the end portion of the rod moves within the slot to permit pivotal movement of the rod.

17. A vehicle locator for marking a vehicle comprising:
   (a) a base for mounting the locator to the vehicle, the base having a mounting section for engaging the vehicle to permit the locator to be mounted on the vehicle and a rod support having a pair of support ribs projecting from the base to provide a groove therebetween;
   (b) a pivot pin traversing the groove supported by the support ribs;
   (c) a cantilevered support rod projecting from the base having a free end of predetermined outside width and a mounting end disposed within the groove and pivotally connected with the pivot pin at the rod support of the base to permit the rod to be pivotally moved between selected positions relative to the base, the rod being frictionally held by the rod support relative to the base to enable the rod to remain in position after the rod is moved between positions; and
   (d) a highly visible marking post having an open end to permit slidable mounting of the post onto the cantilevered support rod in slip fit for marking of the vehicle, the open end of the post having an inside width that is generally the same as the outside width of the free end of the rod so that the cooperating contact between the post and the rod retains the post in position on the rod, wherein the marking post includes a marking sleeve having a clear plastic outer tube and an inner liner visible through the tube.

18. The locator according to claim 17 wherein the mounting end of the rod is in friction fit between the support ribs of the base for maintaining the rod in position upon rotational movement of the rod and wherein the locator includes adjustment means for adjusting the friction fit between the support ribs of the base and the mounting end of the rod.

19. The locator according to claim 17 wherein the base includes a clearance slot in alignment with the groove and wherein the mounting end of the rod is flat and includes an end portion disposed within the clearance slot to provide swing room for the end portion of the mounting end of the rod within the clearance slot during pivotal movement of the rod.

20. A vehicle locator for marking a vehicle comprising:
   (a) a base for mounting the locator to the vehicle, the base having a mounting section for engaging the vehicle to permit the locator to be mounted on the vehicle and a rod support having a pair of support ribs projecting from the base to provide a groove therebetween;
   (b) a pivot pin traversing the groove supported by the support ribs;
   (c) a cantilevered support rod projecting from the base having a free end of predetermined outside width and a mounting end disposed within the groove and pivotally connected with the pivot pin at the rod support of the base to permit the rod to be pivotally moved between selected positions relative to the base, the rod being frictionally held by the rod support relative to the base to enable the rod to remain in position after the rod is moved between positions; and
   (d) a highly visible marking post having an open end to permit slidable mounting of the post onto the cantilevered support rod in slip fit for marking of the vehicle, the open end of the post having an inside width that is generally the same as the outside width of the free end of the rod so that the cooperating contact between the post and the rod retains the post in position on the rod, wherein the marking post includes a marking sleeve having a transparent tube and a fluorescent insert disposed within the tube.

\* \* \* \* \*